US012480400B2

(12) United States Patent
Woskov

(10) Patent No.: US 12,480,400 B2
(45) Date of Patent: Nov. 25, 2025

(54) RATE OF PENETRATION/DEPTH MONITOR FOR A BOREHOLE FORMED WITH MILLIMETER-WAVE BEAM

(71) Applicant: Massachusetts Institute of Technology, Cambridge, MA (US)

(72) Inventor: Paul P. Woskov, Bedford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/722,093

(22) PCT Filed: Oct. 18, 2022

(86) PCT No.: PCT/US2022/078255
§ 371 (c)(1),
(2) Date: Jun. 20, 2024

(87) PCT Pub. No.: WO2023/122372
PCT Pub. Date: Jun. 29, 2023

(65) Prior Publication Data

US 2025/0067171 A1 Feb. 27, 2025

Related U.S. Application Data

(60) Provisional application No. 63/291,731, filed on Dec. 20, 2021.

(51) Int. Cl.
*E21B 47/135* (2012.01)
*E21B 7/15* (2006.01)
(Continued)

(52) U.S. Cl.
CPC .............. *E21B 47/135* (2020.05); *E21B 7/15* (2013.01); *E21B 45/00* (2013.01); *E21B 47/04* (2013.01);
(Continued)

(58) Field of Classification Search
CPC ............. E21B 7/15; E21B 45/00; E21B 47/04
See application file for complete search history.

(56) References Cited

U.S. PATENT DOCUMENTS 5,003,144 A 3/1991 Lindroth et al.
5,824,133 A 10/1998 Tranquilla
(Continued)

FOREIGN PATENT DOCUMENTS

CN 204804691 U 11/2015
CN 210858586 U 6/2020
(Continued)

OTHER PUBLICATIONS

BusinessWire, Quaise Launches with $6 Million to Unlock Earth's Most Abundant Clean Energy Source, 2020, 2 pages.
(Continued)

*Primary Examiner* — Jennifer H Gay
(74) *Attorney, Agent, or Firm* — Smith Baluch LLP

(57) ABSTRACT

Apparatus and methods are described for drilling deep boreholes with millimeter-wave radiation in earthen materials to access deep resources such as geothermal heat. Borehole depth and temperature at the bottom of the borehole can be monitored with probe signals and/or radiative emission from the bottom of the borehole.

19 Claims, 9 Drawing Sheets

(51) Int. Cl.

| | |
|---|---|
| ***E21B 45/00*** | (2006.01) |
| ***E21B 47/04*** | (2012.01) |
| ***E21B 47/07*** | (2012.01) |
| ***G01S 13/10*** | (2006.01) |
| ***G01S 13/32*** | (2006.01) |

(52) U.S. Cl.
CPC .............. *E21B 47/07* (2020.05); *G01S 13/10* (2013.01); *G01S 13/32* (2013.01)

(56) References Cited

U.S. PATENT DOCUMENTS

| | | | | |
|---|---|---|---|---|
| 8,393,410 | B2 * | 3/2013 | Woskov | E21B 7/14 175/11 |
| 8,550,182 | B2 * | 10/2013 | Ouellet | H05B 6/80 166/57 |
| 9,453,373 | B2 | 9/2016 | Shnell | |
| 9,890,594 | B2 | 2/2018 | Hanback | |
| 10,494,870 | B2 | 12/2019 | Hanback | |
| 11,028,648 | B1 * | 6/2021 | Araque | E21B 7/003 |
| 11,078,727 | B2 * | 8/2021 | Gleitman | E21B 7/24 |
| 11,613,931 | B2 * | 3/2023 | Phan | E21B 7/15 333/242 |
| 11,624,241 | B2 * | 4/2023 | Araque | E21B 47/07 175/56 |
| 11,624,242 | B2 * | 4/2023 | Araque | E21B 7/24 175/56 |
| 11,624,243 | B2 * | 4/2023 | Araque | E21B 44/00 175/56 |
| 12,000,283 | B2 * | 6/2024 | Araque | E21B 44/00 |
| 2002/0019524 | A1 | 2/2002 | Cottrell et al. | |
| 2003/0112431 | A1 | 6/2003 | Ketkar | |
| 2007/0068242 | A1 | 3/2007 | DiFoggio | |
| 2008/0037010 | A1 | 2/2008 | Rafac | |
| 2009/0321132 | A1 * | 12/2009 | Ouellet | E21B 7/15 175/11 |
| 2010/0055807 | A1 | 3/2010 | Srivastava et al. | |
| 2010/0059219 | A1 | 3/2010 | Roberts et al. | |
| 2010/0181471 | A1 | 7/2010 | Pop et al. | |
| 2010/0252324 | A1 * | 10/2010 | Woskov | E21B 7/15 166/308.1 |
| 2014/0157877 | A1 | 6/2014 | Abad et al. | |
| 2015/0345225 | A1 | 12/2015 | Kocis | |
| 2018/0209218 | A1 | 7/2018 | Hanback | |
| 2020/0048967 | A1 | 2/2020 | Batarseh | |
| 2020/0370375 | A1 * | 11/2020 | Gleitman | E21B 44/00 |
| 2021/0164332 | A1 | 6/2021 | Skinner et al. | |
| 2022/0136332 | A1 * | 5/2022 | Araque | E21B 7/24 175/56 |
| 2022/0136333 | A1 * | 5/2022 | Araque | E21B 44/00 175/56 |
| 2022/0136334 | A1 * | 5/2022 | Araque | E21B 7/14 175/56 |
| 2023/0008455 | A1 * | 1/2023 | Phan | E21B 7/15 |
| 2023/0160262 | A1 * | 5/2023 | Phan | H01P 11/002 333/242 |
| 2025/0060314 | A1 * | 2/2025 | Woskov | G01N 21/66 |
| 2025/0067171 | A1 * | 2/2025 | Woskov | E21B 47/07 |
| 2025/0092778 | A1 * | 3/2025 | Lee | E21B 47/04 |

FOREIGN PATENT DOCUMENTS

| | | | | |
|---|---|---|---|---|
| CN | 112282648 A | 1/2021 | | |
| CN | 112901253 A | 6/2021 | | |
| WO | 2019046689 A1 | 3/2019 | | |
| WO | WO-2024144961 A2 * | 7/2024 | | E21B 7/14 |

OTHER PUBLICATIONS

Doane, "Parabolic Tapers for Overmoded Waveguides," International Journal of Infrared and Millimeter Waves, 5.5 (1984): 737-751.
Hassani et al. "The development of microwave assisted machineries to break hard rocks." Proceedings of the 28th International Symposium on Automation and Robotics in Construction, Seoul, South Korea 2011, 7 pages.
IBIS—Mining in the US—Market Research Report (2014-2029), accessed at https://www.ibisworld.com/united-states/market-research-reports/mining-sector/ on Sep. 26, 2024, 28 pages.
International Search Report and Written Opinion in International Application No. PCT/US2022/078254 mailed Jan. 17, 2023, 13 pages.
International Search Report and Written Opinion in International Application No. PCT/US2022/078255 mailed Mar. 10, 2023, 13 pages.
Monchusi, "Microwave-assisted rock breaking modelling and application." CSIR Centre for Mining Innovation, Oct. 2012, 1 page.
Petrov, New Applications of Radio Electronics: Weakening Rocks with Powerful Microwaves, Radio Electronics and Telecommunications, No. 2, 2002 pp. 35-41 Russia.
Petrov, Weakening Rocks with Powerful Electromagnetic Microwave Field, INFORMOST "Radioelectronics and Telecommunications" 2002, 19 pages.
Prokopenko, "Microwave heating for emolliating and fracture of rocks." Advances in Induction and Microwave Heating of Mineral and Organic Materials. IntechOpen, 2011, 27 pages.
Salsman et al., Short-pulse microwave treatment of disseminated sulfide ores. Mineral Eng., 1996, 9, No. 1, c. 43-54.
Schaub et al., "Simple Expressions for the Design of Linear Tapers in Overmoded Corrugated Waveguides," Journal of Infrared, Millimeter, and Terahertz Waves 37 (2016): 100-110.
Shultz, et al., Game Changers: Energy on the Move, chap. 1, Hoover Institution Press, Stanford University, 2015, 10 pages.
Walkiewicz et al., "Microwave-assisted grinding," Conference Record of the IEEE Industry Applications Society Annual Meeting, vol. 2, doi: 10.1109/IAS. 1989.96845,(1989), pp. 1528-1532.
Walkiewicz et al., "Microwave-assisted grinding." IEEE Transactions on Industry Applications 27.2 (1991): 239-243.
Woskov "A Reflected Power Isolator for a 10 kW, 28 GHz Gyrotron," Microwave Symposium Digest (IMS), 2013 IEEE MTT-S International, Seattle, WA, Jun. 2-7, 2013, 3 pages.
Woskov et al., "Drilling and Fracturing with Millimeter-Wave Directed Energy," MIT Plasma Science and Fusion Center Report, Dec. 2008, 7 pages.
Woskov et al., "Millimeter-Wave Heating, Radiometry, and Calorimetry of Granite Rock to Vaporization," Journal of Infrared, Millimeter, and Terahertz Waves 33 (2012): 82-95, 16 pages.
Woskov et al., "Millimeter-Wave Monitoring for Nuclear Waste Vitrification." Nuclear Waste Research: Siting, Technology and Treatment (2008): 75-105.
Woskov et al., "High Temperature 2-D Millimeter-Wave Radiometry of Micro Grooved Nuclear Graphite," Proceedings MRS2012 Fall Meeting, Boston, MA, (2012), 6 pages.
Woskov et al., Millimeter-Wave Radiometer Diagnostics of Harmonic Electron Cyclotron Emission in the Levitated Dipole Experiment, Review of Scientific Instruments 81.10 (2010): 10D910, 4 pages.
Woskov et al., "Penetrating Rock with Intense Millimeter-Waves," 2014 39th International Conference on Infrared, Millimeter, and Terahertz Waves, (IRMMW-THz 2014), IEEE, 2014, 2 pages.
Woskov, "Millimeter-Wave Directed Energy Deep Boreholes." AIG Drilling for Geology II Conference Brisbane, Australia. 2017, 11 pages.
Woskov, Notch Filter Options for ITER Stray Gyrotron Radiation (2015), 1 page.
Chinese Notice of Allowance with translation in Chinese App. No. 2022800835615, dated May 1, 2025, 4 pages.
Chinese Search Report with translation in Chinese App. No. 2022800835615, dated Apr. 23, 2025, 4 pages.

* cited by examiner

140a

RATE OF PENETRATION/DEPTH MONITOR FOR A BOREHOLE FORMED WITH MILLIMETER-WAVE BEAM

CROSS-REFERENCE TO RELATED APPLICATIONS

The present application is a U.S. national stage filing under 35 U.S.C. § 371 of PCT/US2022/078255, filed Oct. 18, 2022, titled "Rate of Penetration/Depth Monitor for a Borehole formed with Millimeter-Wave Beam," which claims a priority benefit, under 35 U.S.C. § 119 (e), to U.S. Application No. 63/291,731 filed on Dec. 20, 2021, titled "Rate of Penetration/Depth Monitor for a Millimeter-Wave Beam Made Hole," which application is incorporated herein by reference in its entirety.

GOVERNMENT SUPPORT

This invention was made with government support under DE-AR0001051 awarded by the U.S. Department of Energy. The government has certain rights in the invention.

BACKGROUND

A high-power millimeter-wave beam produced by a gyrotron can make a borehole in rock by melting and/or vaporizing the rock. This borehole opening process operates at temperatures greater than the melting and vaporization temperatures of rock of 1000° C. and 3000° C., respectively. Conventional sensors used for monitoring mechanically drilled boreholes require physical contact with the bottom of the borehole and cannot survive at these temperatures.

SUMMARY

The present technology can be used to form deep boreholes in rock with a high-power millimeter-wave beam and to monitor the bottom of the borehole. The monitoring equipment can remain on the ground surface, at ambient temperature and pressure, regardless of the borehole depth or temperature.

The present technology includes a method of measuring a depth and/or a rate of penetration of a borehole drilled with a millimeter-wave drilling beam guided by a transmission line to the bottom of the borehole. This method includes coupling a probe signal into the transmission line. The transmission guides the probe signal to the bottom of the borehole, and at least a portion of the probe signal reflects and/or scatters from the bottom of the borehole as a return beam. The transmission line guides the return beam from the bottom of the borehole. The return beam is coupled out of the transmission line and mixed with a local oscillator to produce an intermediate frequency beam whose amplitude and/or frequency are used to determine the depth and/or the rate of penetration of the borehole.

In some cases, the amplitude of the probe signal is modulated, in which case the depth and/or the rate of penetration of the borehole can be based on the amplitude of the intermediate frequency beam. In other cases, the frequency of the probe signal is modulated, in which case the depth and/or the rate of penetration of the borehole is based on the frequency of the intermediate frequency beam. And in yet other cases, the probe signal comprises a pulse and the depth and/or the rate of penetration of the borehole is based a time of flight of the pulse.

The probe signal can be generated at a frequency different than a frequency of the millimeter-wave drilling beam or can be picked off from the millimeter-wave drilling beam.

If desired, a temperature signal at a temperature signal frequency different than the frequency of the millimeter-wave drilling beam (and different than the probe frequency) can be coupled into the transmission line with the probe signal for determining the temperature at the bottom of the borehole.

Other embodiments of the present technology include a system for drilling a borehole with a source, transmission line, depth/rate-of-penetration monitor, and beam combiner. In operation, the source generates a millimeter-wave drilling beam. The transmission line, which is coupled to the source, guides the millimeter-wave drilling beam to the bottom of the borehole. The depth/rate-of-penetration monitor, which is also coupled to the transmission line, monitors a depth and/or a rate-of-penetration of the borehole. And the beam combiner, which is coupled to the transmission line and the depth/rate-of-penetration monitor, couples a probe signal into the transmission line for transmission to the bottom of the borehole and couples a return beam generated by reflection and/or scattering of the probe signal from the bottom of the borehole from the transmission line to the depth/rate-of-penetration monitor.

The depth/rate-of-penetration monitor can be configured to operate as a reflectometer, frequency-modulated radar, or pulse-modulated time of flight radar. The depth/rate-of-penetration monitor can generate the probe signal at a frequency different than a frequency of the millimeter-wave drilling beam. In other cases, the beam combiner directs a portion of the millimeter-wave drilling beam returned from the bottom of the borehole to the depth/rate-of-penetration monitor as the return beam.

The beam combiner may comprise a miter mirror to reflect the millimeter-wave drilling beam around a bend of the transmission line. There can be a hole in the miter mirror to pass radiation at the probe frequency and to reject radiation at the frequency of the millimeter-wave drilling beam.

The system may also include a temperature monitor to receive a temperature signal for monitoring a temperature of the borehole at a temperature signal frequency different than the frequency of the millimeter-wave drilling beam and different than the probe frequency. And it can include a small-signal beam combiner, coupled to the depth/rate-of-penetration monitor, the temperature monitor, and the beam combiner, to couple the temperature signal with the probe signal.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
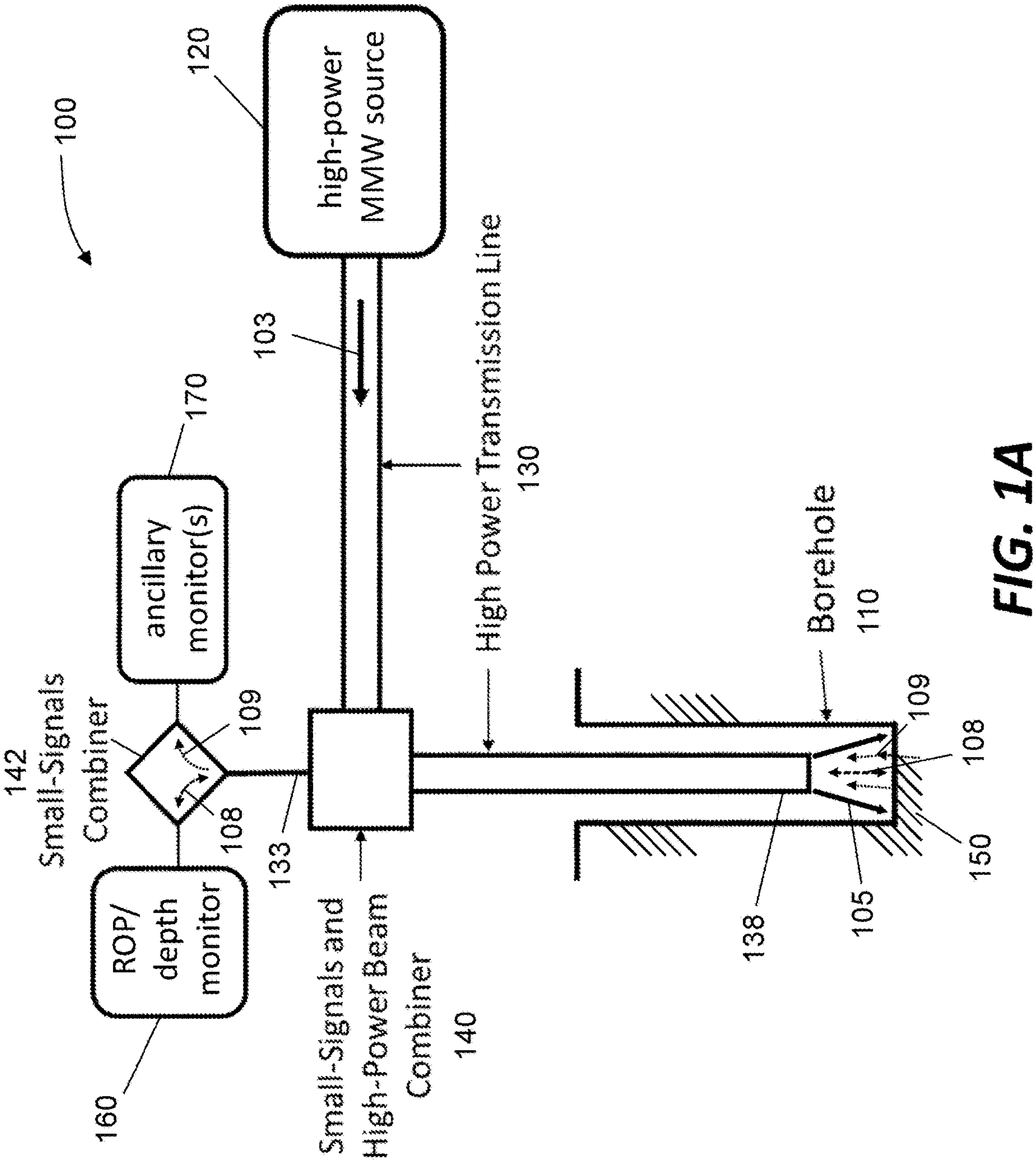
FIG. 1A illustrates a directed-energy millimeter-wave (MMW) drilling system that uses a high-power drilling beam to drill a borehole and at least one colinear, small-signal probe signal at a different frequency than the high-power drilling beam to monitor the rate of penetration (ROP) and/or depth of the borehole.

FIG. 1A shows a high-power, directed-energy millimeter-wave (MMW) drilling system 100 with at least one monitor 160 for sensing the rate of penetration (ROP) and/or depth of a borehole 110 made by the system in materials 150, such as earthen material. The system 100 can also include one or more ancillary monitors 170 to monitor one or more conditions at a bottom of the borehole 110, such as temperature, surface emissivity ε, and melt turbulence among other characteristics. The drilling system 100 uses a high-power MMW drilling beam 105 to “drill” a borehole 110 into the material 150. The drilling can comprise melting, vaporizing, and/or ablating the material as the borehole deepens.

High-power MMW radiation 103 from the high-power source 120 can be coupled into high-power transmission lines 130 (which may be implemented as waveguides) and delivered to the bottom of the borehole 110. At the bottom of the borehole, the high-power MMW radiation 103 can exit the distal end 138 of the transmission line 130 and form the drilling beam 105 that interacts with material in its path. According to some embodiments, the drilling beam 105 has sufficient power to melt granite, for example. A high-power source 120, such as a gyrotron, can generate the MMW radiation 103 at a frequency in a range from approximately or exactly 30 GHz to approximately or exactly 300 GHz with an average power in a range from approximately or exactly 100,000 Watts to approximately or exactly 2,000,000 Watts. The MMW radiation 103 can be continuous wave at these power levels or can be pulsed to produce higher instantaneous power levels.

The power and frequency of MMW radiation 103 from the high-power source 120 can be constant with time when the system 100 is drilling the borehole 110. For example, the power and frequency may remain constant for seconds, minutes, tens of minutes, or even over an hour as the borehole is drilled. In some cases, one or both of the power and frequency of MMW radiation 103 from the high-power source 120 can vary within the frequency range and power range described above when the system 100 is drilling the borehole 110. For example, the frequency and/or power may change when encountering different materials to improve energy coupling to and heating of the different materials.

Probe signals 108, 109 from the monitors 160, 170 can be radiatively coupled into and from the high-power transmission line 130 with one or more combiners 140, 142. The probe signal(s) 108, 109 can be at one or more different frequencies from a frequency of the high-power drilling beam 105 to sense condition(s) at the bottom of the borehole 110. Further, the probe signal 108 from the ROP/depth monitor 160 can be at a different frequency than a frequency or frequencies used for the ancillary monitor(s) 170. For example, the frequency used for the ROP/depth monitor can be in a range from 10 GHz to 300 GHz. In some cases, the frequency used for the ROP/depth monitor can be in a range from 10 GHz to 1 THz. The frequency used for the ancillary monitor(s) can also be in a range from 10 GHz to 300 GHz. In some cases, the frequency used for the ancillary monitor(s) can be in a range from 10 GHz to 1 THz. The power level of probe signals can be in a range from 0.1 Watt to 100 Wats, or even higher power levels in some cases. When detecting thermal emission from the bottom of the borehole 110, the power level of a received probe signal 109 can be less than 0.1 Watt. The phrase “probe signal” is used herein to refer to a signal that is launched into the borehole by the ROP/depth monitor 160 or an ancillary monitor 170 and used for measuring a characteristic of the borehole 110. In some cases, an ancillary monitor (such as a temperature radiometer) may not launch a probe signal and instead receive and monitor radiative emissions (e.g., black body radiation) from the borehole. Conditions that can be sensed by the ROP/depth monitor 160 and ancillary monitor(s) include but are not limited to: the rate of penetration of the borehole 110 as it is being drilled, the depth of the borehole 110, surface emissivity ε of the earthen material, and a temperature of earthen material 150 as the borehole 110 is being drilled. The depth of the borehole 110 may or may not be measured while the borehole is actively being drilled.

The high-power transmission line 130 guides the high-power MMW radiation 103 from the high-power source 120 to the bottom of the borehole, where the drilling beam 105 can vaporize rock and other material. The high-power transmission line 130 is typically hollow and of a size that is more than one wavelength in diameter (overmoded) so it can handle high power. It is constructed to reduce or minimize mode conversion so that the most efficient fundamental mode can propagate with minimum losses. There can be some purposeful mode conversion for special applications at launch from the distal end 138 or to negotiate a bend more efficiently, but largely the MMW radiation 103 propagates through the high-power transmission line 130 in a single mode for efficient long-distance transmission. The linearly polarized $HE_{11}$ mode is the most efficient mode in a circular high-power transmission line 130 that is internally corrugated having a good conductor metal surface, such as copper. Other suitable modes include the azimuthally polarized $TE_{01}$ mode in a smooth-walled metal waveguide. This has 69% of the efficiency of the $HE_{11}$ mode in an internally corrugated circular waveguide. The $HE_{11}$ mode can also be guided by the borehole 110, which acts like a dielectric waveguide, such as a hollow fiber optic cable. For example, the drilling beam 105 can vitrify walls of the borehole 110 as it advances forming a hollow, circular dielectric waveguide.

The MMW drilling system 100 can include a ROP/depth monitor 160 that is radiatively coupled to the high-power transmission line 130. The ROP/depth monitor 160 generates a small-signal probe signal, also called a probe signal 108 or probe beam, which can be at a different frequency than the drilling beam 105 for sensing the ROP and/or depth of the borehole. For example, the probe signal 108 may be centered at a probe frequency in a frequency range from 30 GHz to 1 THz range with a bandwidth up to 5 GHz. In some cases, the frequency of the probe signal 108 can vary over frequencies within this range of frequencies when making measurements. Preferably, the probe signal 108 can be guided by the same high-power transmission line 130 that guides the drilling beam 105. The average probe signal power can be in a range from 0.01 Watt to 10 Watts and may be constant or vary over a range of power levels within this range when making a measurement.

One or more ancillary monitors 170 may generate and/or receive one or more other small-signal probe signals 109 at other frequencies for probing or monitoring other parameters associated with drilling the borehole 110 and the MMW drilling system 100. In some cases, an ancillary monitor 170 receives radiative emissions from the borehole for analysis. For instance, the ancillary monitor 170 may monitor the borehole temperature by radiometry and/or the waveguide/borehole fill composition by millimeter-wave or terahertz spectroscopy, respectively. In some implementations, the temperature can be monitored by millimeter-wave thermal emission from the bottom of the borehole 110 that couples into the transmission line 130 and propagates back to the ancillary monitor 170. The radiometer antenna pattern defined by the high-power transmission line 130 and 138 selects the viewed spot size that forms the returned temperature signal. (Thermal emission occurs in all modes, with the receiver antenna pattern selecting the mode(s) that will propagate along the high-power transmission line 130 and be detected by the ancillary monitor 170. Therefore, the returned thermal signal 109 has properties that are defined at least in part by the radiometer field of view.) In some cases, the fill composition can be monitored by millimeter-wave or terahertz spectroscopic emission or absorption. Spectroscopy performed by an ancillary monitor 170 can be either passive using the thermal blackbody emission background or local plasma excited emission, or active with a frequency-swept probe signal. For passive spectroscopy, the receiving antenna (essentially the high-power transmission line 130) essentially defines the return signal, as is the case for the return temperature signal. For active probing, the high-power waveguide defines and guides the probe signal. These ancillary probe signals may have average power levels in a range from 0.1 Watt to 100 Watts and may operate at one or more frequencies in a range from 30 GHz to 1 THz.

In some implementations, temperature monitoring can include launching a temperature probe signal by an ancillary monitor 170 into the borehole 110. The temperature probe signal can be used to determine surface emissivity $\varepsilon$ at the bottom of the borehole. Generally, the radiative emission from the bottom of the borehole (and detected by a temperature radiometer) is the product of surface emissivity and temperature ($\varepsilon T$). The emissivity can have a value in a range from 0 to 1. Knowing the surface emissivity can provide a more accurate determination of temperature of earthen material 150 at the bottom of the borehole 110. Emissivity can be measured by measuring the reflectivity of the surface with the temperature probe signal. For an opaque surface the emissivity can be found from the expression, $\varepsilon=1-r$, where r is the surface reflection.

Temperature monitoring can be useful for two reasons. First, the temperature of the earthen material can be monitored while drilling to improve removal efficiency. For example, a certain temperature may be maintained while drilling (e.g., using a feedback loop that receives a signal from the drilling area indicative of temperature and adjusts delivered power accordingly). The maintained temperature may be one that vaporizes the earthen material or ablates it into predominantly micro-particles that can be ejected from the borehole using high-pressure gas. The pressurized gas can be pumped down the transmission line 130 and pressurized by energy from the drilling beam 105 which increases the temperature of material in the confined borehole volume as described by the ideal and real gas laws while vapors and/or micro-particles are ejected upward outside the transmission line.

Second, for geothermal heat access, temperature monitoring is also useful when drilling has ceased, and the earthen material allowed to cool to a lower temperature or its steady-state temperature. In this case, the temperature monitoring can determine when a sufficient depth is reached to access the geothermal heat. For example, the temperature may fall to its steady-state temperature, which can be measured by a temperature monitor. Alternatively, at least one lower temperature can be measured as the temperature falls to its steady-state temperature. A steady-state temperature (at which geothermal energy can be harnessed and further drilling is not needed) can be in a range from 50° C. to 500° C. An exponential or functional fit to the falling temperature may be used to determine an ultimate steady-state temperature at the bottom of the borehole.

The ancillary probe signal(s) 109 from the ancillary monitor(s) 170 can be combined with the probe signal 108 from the ROP/depth monitor 160 by a small-signal combiner 142 onto a common small-signal transmission line 133 that carries the probe signals 108, 109 to and from a power combiner 140, as depicted in FIG. 1A. The power combiner 140 couples the combined small-signal probe signals 108, 109 from the small-signal transmission line 133 to the high-power transmission line 130 that also guides the high-power MMW radiation 103 to the bottom of the borehole 110. At the bottom of the borehole 110, the probe signals 108, 109 can exit and/or enter the distal end 138 of the transmission line 130 to sense physical characteristics (e.g., rate of penetration, temperature, depth of borehole, material composition, melt turbulence, etc.) Black body radiative emissions from the heated earthen material 150 can also enter the distal end 138 of the transmission line 130 for transmission to an ancillary monitor 170.

The small-signal probe signals 108, 109 can return from the bottom of the borehole 110 and can be guided by the high-power transmission line 130 back to the power combiner 140, which couples the returned small-signal probe signals 108, 109 to the small-signal combiner 142 via the small-signal transmission line 133. The small-signal combiner 142 directs the different small-signal probe signals 108, 109 and/or radiative emissions to the respective monitors 160, 170. The return signals can be divided and sent to the respective monitors using frequency, polarization, or time to demultiplex the signals at the small-signal combiner 142. The monitors 160, 170 measure the amplitude, frequency, and/or phase of their corresponding received probe signal to derive some information about conditions at the bottom of the borehole 110, such as the drilling beam's rate of penetration, the borehole depth, surface emissivity, melt turbulence, and/or temperature among other characteristics. Because the monitors 160, 170 derive information from the returned probe signals 108, 109 and/or radiative emissions, they can remain on the ground surface, far from the bottom of the borehole 110 which is heated to extreme temperatures. As a result, the monitors do not have to be as rugged as the downhole monitors used to monitor mechanical drills, for example. They can also monitor conditions at the bottom of the borehole 110 that are more extreme (e.g., hotter) than those at bottom of boreholes made with mechanical drills.

Evaluating melt turbulence can be beneficial for drilling deep boreholes. Melt turbulence can indicate a level of viscosity of the molten earthen material 150. For some drilling applications, once a suitable viscosity is reached, the molten earthen material 150 can be displaced to the wall of the borehole where it will cool to form a solid casing that lines the borehole 110. This self-casing can stabilize the borehole 110 and may be sufficiently strong in some cases to prevent collapse of the borehole.

Figures 1B, 1C:
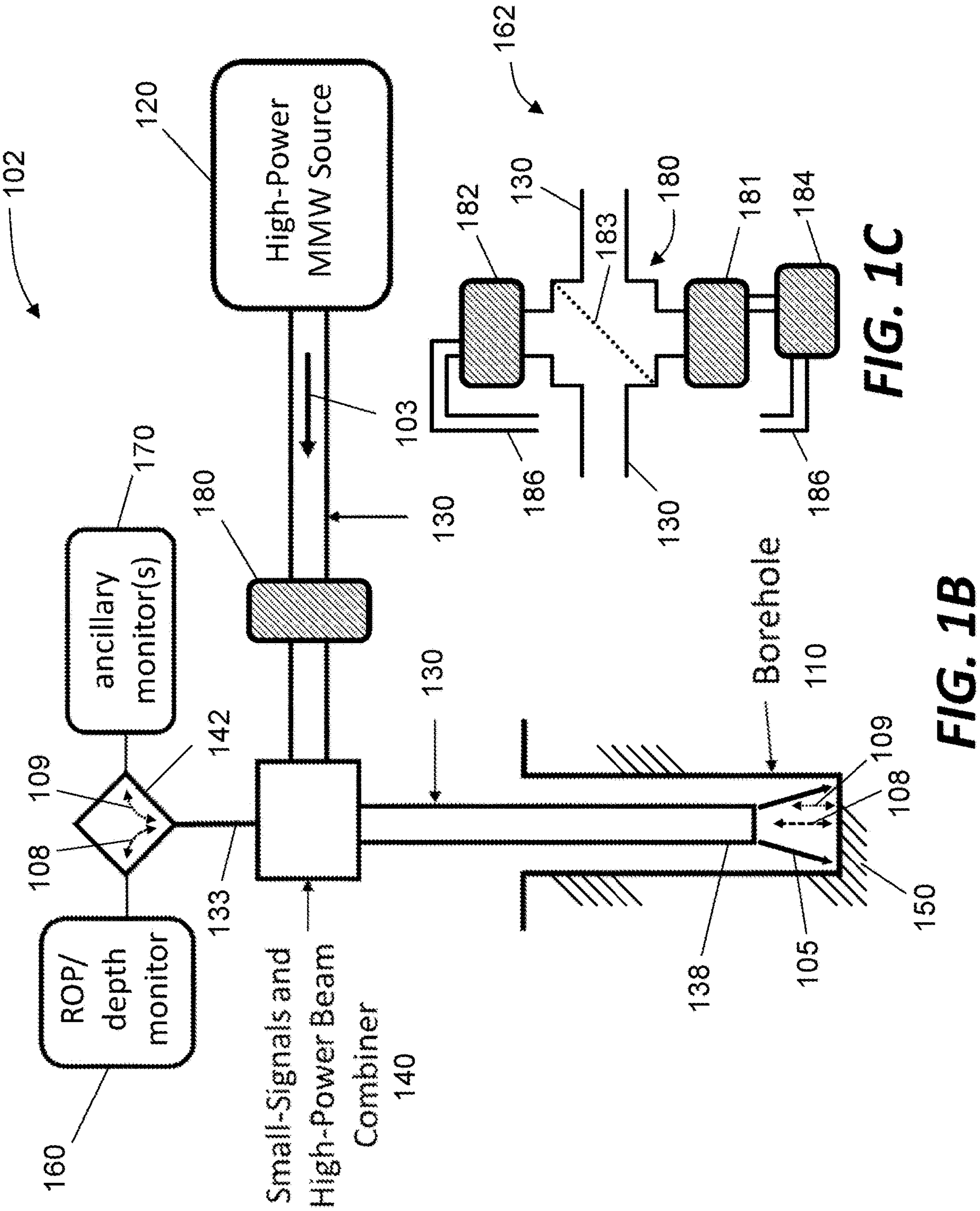
FIG. 1B illustrates an implementation of a MMW drilling system that uses a high-power drilling beam to drill a borehole and also to monitor the rate of penetration (ROP) and/or depth of the borehole.
FIG. 1C depicts details of a ROP/depth monitor that can be implemented with an isolator and detector and can use the MMW radiation used to drill the borehole.

FIG. 1B and FIG. 1C illustrate an alternative high-power, directed-energy MMW drilling system 102. This system 102 can monitor the rate of penetration and/or depth of the borehole using a portion of the high-power MMW radiation instead of a probe signal 108 at a different frequency. As in FIG. 1A, a gyrotron or other high-power MMW source 120 generates high-power MMW radiation 103, which is guided to the bottom of a borehole with a high-power waveguide or transmission line 130. In this case, however, the rate-of-penetration/depth monitor does not generate and launch a probe signal at a frequency different than the frequency of the high-power MMW radiation 103 that forms the drilling beam 105. Instead, a beam pick-off by the isolator 180 couples a small portion of the forward high-power MMW radiation 103 via beam dumps 181, 182 to a gyrotron frequency detector 184 at one of the beam dumps. In addition, the reflected power isolator 180 simultaneously couples a portion of the high-power MMW radiation 103 returned from the bottom of the borehole 110 to the detector 184. The returned MMW radiation 103 can be coupled through a small-signal transmission line 186 from a reflected power beam dump 182.

FIG. 1C depicts further details of the isolator 180 and detector 184, which can be part of another implementation of a ROP/depth monitor 162. More specifically, the reflected power isolator 180 can include a polarizer grill 183 of copper wires at a 45-degree angle to the axis of the high-power transmission line 130. There can be two beam dumps 181, 182 opposite each other on each side of the polarizer grill 183. The MMW radiation 103 is primarily linearly polarized in the $HE_{11}$ mode that passes through the polarizer grill of the power isolator 180 but typically there are unwanted small power components in the wrong polarization that do not pass through the polarizer. The power isolator 180 filters and/or reflects other polarization components of the MMW radiation 103 out to the side beam dumps 181, 182 depending on the direction of travel of the MMW radiation 103. One forward beam dump 181 can absorb the filtered forward power and the second reflected power beam dump 182 can absorb the return reflected power. In some cases, the beam dumps 181, 182 are not perfect and can cross scatter power to each other. In such cases, a small-signal waveguide 186 may not be needed. The polarizer grill 183 reflects power returned from the target at the bottom of the borehole 110 into the reflected power beam dump 182. This returned and reflected power has its polarization flipped 90 degrees by a circular polarizing mirror in the miter bend that would be part of the small-signals and high-power beam combiner 140 as shown in FIG. 2A. A circular polarizing mirror has grooves in its surface that circularly polarize an incident linearly polarized beam and re-polarizes a return refection to an orthogonal linear polarization to the incident beam. The detector 184 (e.g., a 28 GHz diode) located off center on the forward beam dump 81 picks up these signals rejected by the polarizer grill. The forward and returned signal components coherently interfere in the diode detector to produce a detected signal amplitude that depends on the relative phase of the forward and reflected signals that in turn depends on the distance to the rock melt surface. The isolator 180 and detector 184 can be used to implement a second ROP/depth monitor 162 that can be used alone or in addition to the ROP/depth monitor 160 (which can operate at a different frequency) to improve distance measurement reliability and accuracy.

In the second ROP/depth monitor 162, the reflected signal from the polarizing grill mixes coherently with the portion of the forward-traveling high-power MMW radiation 103 coupled to the ROP/depth monitor 162 for use as a local oscillator. The ROP/depth monitor 160 can have its own frequency source that provides the local oscillator signal for that monitor, which can be at a frequency different than the frequency of the MMW radiation 103. The ROP/depth monitors 160, 162 detect their beat or intermediate frequency caused by mixing their respective local oscillator signals with received reflected signals from the borehole 110 and they process their respective detected beat signals to determine ROP or depth of the borehole 110. If the MMW radiation 103 and drilling beam 105 are at a constant frequency, the rate-of-penetration/depth monitor 162 acts a reflectometer, with the number of amplitude maxima and minima representing the depth of the borehole as described below. If the frequency of the MMW radiation 103 and drilling beam 105 are chirped or swept, the rate-of-penetration/depth monitor 162 acts as a frequency-modulated (FM) radar, with the phase or frequency of the beat representing the depth of the borehole as described below. Similarly, the frequency source of the ROP/depth monitor 160 can be fixed or swept to operate the ROP/depth monitor as a reflectometer or FM radar, respectively.

1. Combining Frequency-Multiplexed Probe Signals with Guided High-Power MMW Radiation In some examples, the high-power MMW radiation 103, small-signal probe signals 108, 109, and radiative emissions of interest from the bottom of the borehole 110 are at different frequencies so that they can be frequency multiplexed and demultiplexed using the small-signal combiner 142 and power combiner 140. The small-signal monitors 160, 170 can be radiatively coupled to the high-power transmission line 130 by using fundamental mode microwave/millimeter-wave waveguide components, such as signal dividers, directional couplers, or frequency multiplexers. (A waveguide that supports only a fundamental mode has a cross section less than one wavelength or on the order of one-half wavelength of the radiation used by a small-signal monitor 160 or 170.) The monitors' probe signals 108, 109 can be coupled to the high-power transmission line 130 using configurations described in connection with FIG. 2A and FIG. 2B. The high-power transmission line 130 can be overmoded for the probe signals (e.g., a waveguide diameter used for the transmission line 130 can be much larger than the wavelength of radiation used for the probe signals 108, 109).

Figure 2B:
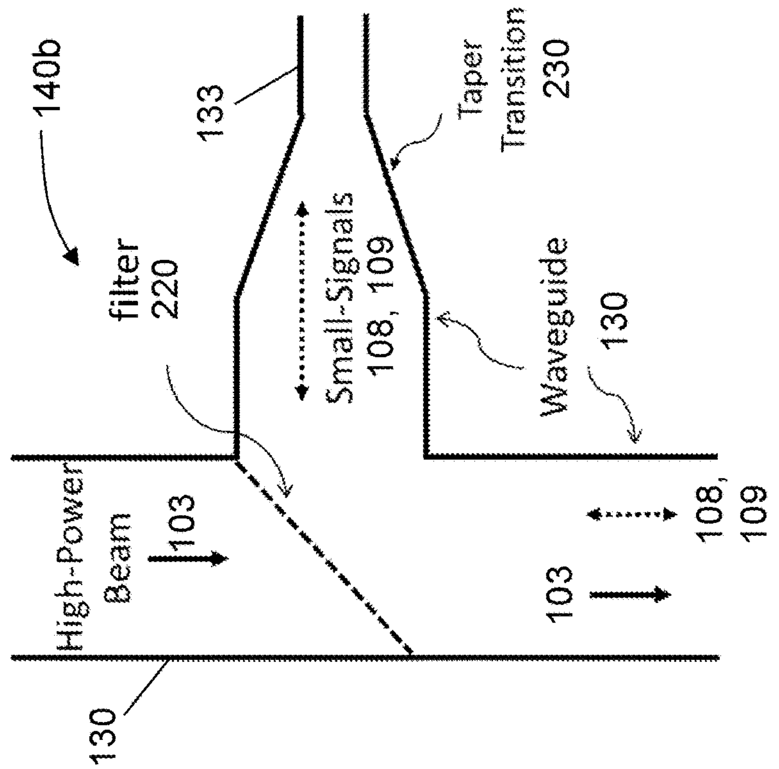
FIG. 2B illustrates another implementation of a beam combiner for combining the high-power heating beam with one or more lower-frequency probe signals in a directed-energy MMW drilling system like that illustrated in FIG. 1A.
Figure 2A:
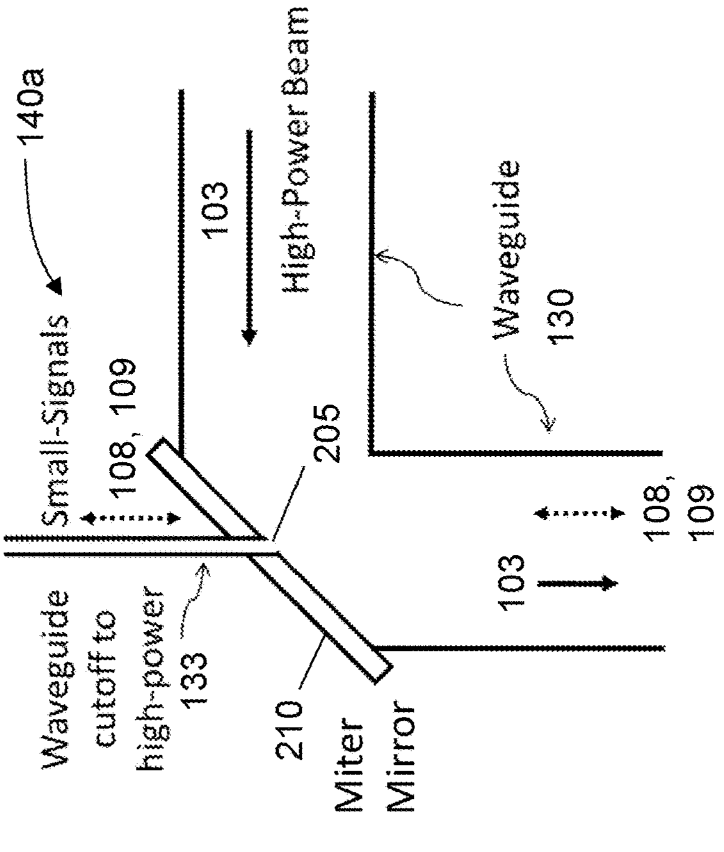
FIG. 2A illustrates an implementation of a beam combiner for combining the high-power heating beam with one or more higher-frequency probe signals in the directed-energy MMW drilling system of FIG. 1A.

FIG. 2A and FIG. 2B depict examples of power combiners 140*a*, 140*b* that can radiatively couple the small-signal probe signals 108, 109 propagating to and from the monitors 160, 170 onto and from the high-power transmission line 130 that carries the high-power MMW radiation 103 to the bottom of the borehole 110. The configuration of the power combiner depends on the relative frequencies of the small-signal probe signals 108, 109, radiative emissions of interest, and the high-power MMW radiation 103. The power combiner 140*a* in FIG. 2A can combine a small-signal probe signal at higher frequency with a lower frequency high-power MMW radiation 103 traveling along the transmission lines 130. The power combiner 140*b* in FIG. 2B can combine a small-signal probe signal 108 and/or probe signal 109 at lower frequency with a higher frequency high-power drilling beam.

In the beam combiner of FIG. 2A, a small coupling hole 205 in a miter mirror 210 that is mounted at a bend in the high-power transmission line 130 can be used to couple in the higher-frequency probe signal(s) 108, 109 with the lower-frequency MMW radiation 103 without perturbing the drilling beam 105. The high-power MMW radiation 103 reflects off the miter mirror 210, e.g., downward toward the bottom of the borehole 110 as in FIG. 1A. At the same time, the small-signal probe signals 108, 109 from the monitors 160, 170 propagate through the coupling hole 205 in the miter mirror 210 and downward to the bottom of the borehole. The returned small-signal probe signals 108, 109 and/or radiative emissions pass upward through the hole 205 in the miter mirror 210 to the monitors 160, 170. The diameter of the coupling hole 205 and/or inside diameter of the small-signal transmission line 133 are less than one half wavelength of the high-power MMW radiation 103 to prevent the MMW radiation 103 from propagating toward the monitors 160, 170. In other words, the coupling hole 205 in the miter mirror 210 and/or small-signal transmission line 133 allow only evanescent propagation of the MMW radiation 103 toward the monitors 160, 170 and effectively act(s) as a low-frequency cutoff or high-pass filter. Mode conversion loss in the coupling between the small-signal transmission line 133 and the high-power transmission line 130 can be calibrated out.

In the power combiner 140*b* of FIG. 2B, a dichroic or polarization-dependent filter 220 in the high-power transmission line 130 passes the higher frequency high-power MMW radiation 103 and reflects the lower frequency small-signal probe signals 108, 109 and/or radiative emissions from the bottom of the borehole 110. More specifically, a polarization-dependent filter 220 could be implemented as a wire grill or mesh with a low density of wires. For example, a wire grill (comprising straight, parallel conductive wires or conductive traces) can transmit a first, linearly polarized wave and reflect a second linearly polarized wave having its polarization oriented orthogonal to the first polarized wave. As another example, a dielectric window mounted at an appropriate angle or thickness can be used as a frequency-selective filter 220 to separate radiation at two different frequencies. The filter 220 is configured to transmit the high-power MMW radiation 103 downward toward the bottom of the borehole 110. The dichroic or polarization-dependent filter 220 also reflects the probe signals 108, 109 from the monitors 160, 170 downward toward the bottom of the borehole 110 via the high-power transmission line 130 and reflects the returned probe signals 108, 109 and/or radiative emissions of interest toward the monitors 160, 170 via the small-signal transmission line 133.

A transition region comprising a section of tapered waveguide 230 can be located between the small-signal transmission line 133 and the high-power transmission line 130 and may be located near the dichroic or polarization-dependent filter 220 (e.g., within 10 cm of the mirror). The tapered waveguide 230 can transform the transverse mode from the small-signal transmission line 133 to better match to a mode supported by the high-power transmission line 130 and vice versa so as to reduce mode coupling losses between the two transmission lines. In some cases, even though the wavelength(s) of the probe signal(s) can be longer than the wavelengths of the high-power MMW radiation 103, the diameter of the small-signal transmission line 133 can be much smaller than the diameter of the high-power transmission line 130. The tapered waveguide 230 aides in coupling the probe signals 108, 109, which propagate in the small-signal transmission line 133, to and from the larger high-power transmission line 130. The taper of the tapered waveguide 230 can be linear or parabolic and should be long enough to reduce or minimize mode conversion losses (e.g., below 10 dB). Parabolic tapers are generally shorter than linear tapers. The internal surface of the tapered waveguide 230 preferably matches the internal surfaces of the transmission lines to which the tapered waveguide 230 connects. For example, the tapered waveguide 230 may have a corrugated internal surface to transmit the $HE_{11}$ mode efficiently when the transmission lines 130, 133 to which it connects are implemented as waveguides having corrugated internal surfaces. The end widths (diameters) of the tapered waveguide 230 are sized to match the widths (diameters) of the transmission lines to which the ends connect. A high-power gyrotron frequency notch filter may also be added to the small signal monitoring waveguide to further reject any stray or scattered high-power gyrotron electromagnetic radiation.

One example of a high-power dielectric component that can be used in a power combiner 140*b* is a diamond plate oriented at Brewster's angle, which is 67 degrees for diamond in air at one atmosphere pressure. The diamond plate combines and separates beams with orthogonal linear polarizations. At Brewster's angle, the polarization in the plane-of-incidence (plane containing the incident and reflected beam vectors and the normal to the plate) is transmitted with no loss (except for very minor plate absorption) and the beam with perpendicular polarization to the plane-of-incidence is highly reflected. The transmitted beam would be the high-power MMW radiation 103 propagating along the high-power transmission line 130 and the reflected beam would be the probe signal 108 and/or probe signal 109.

Figure 3:
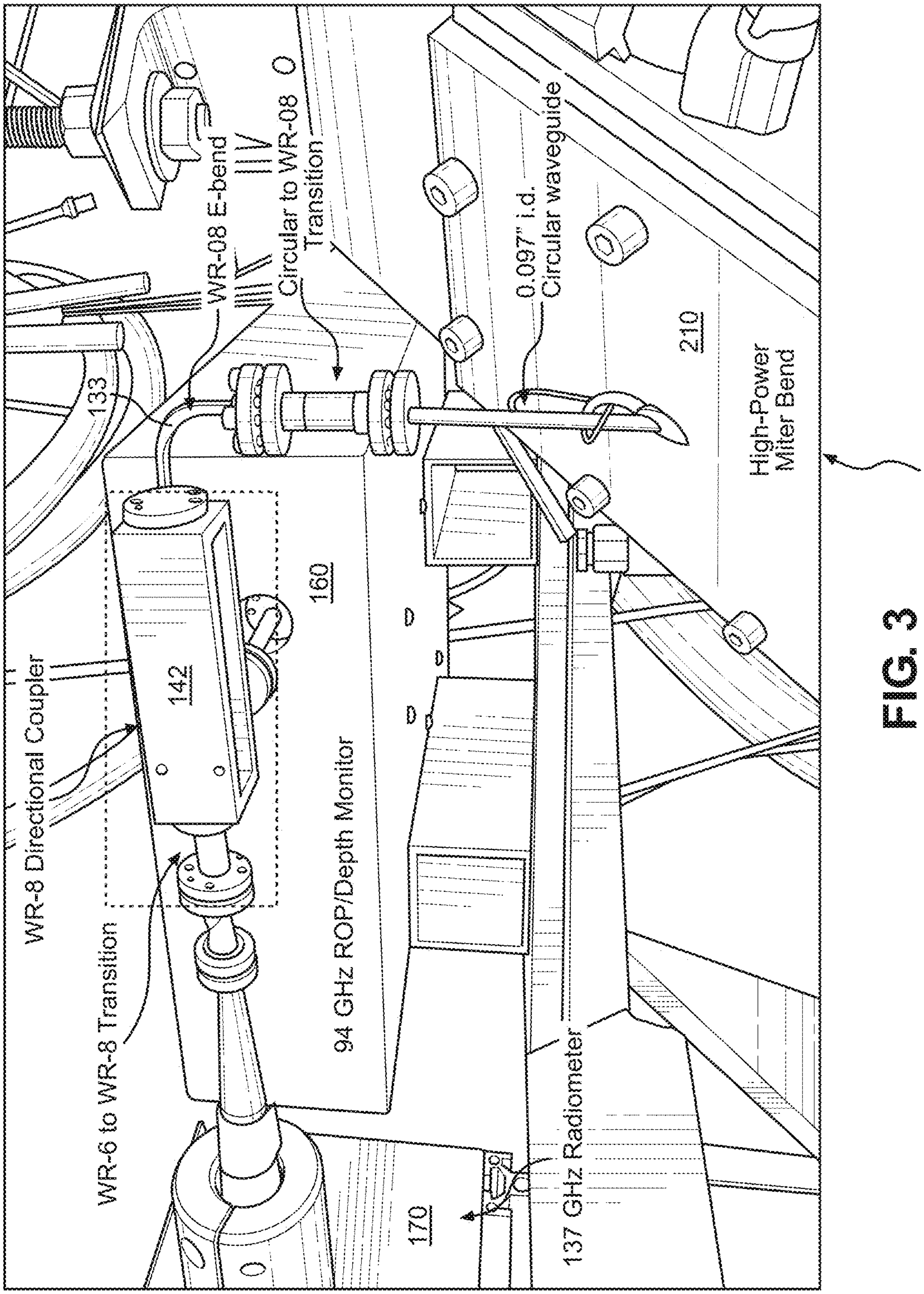
FIG. 3 is a photograph of a portion of the MMW drilling system of FIG. 1A that includes a small-signal combiner that combines a 94 GHz beam for monitoring borehole ROP/depth and a 137 GHz beam for monitoring borehole temperature with a 28 GHz high-power heating beam propagating through a high-power miter bend on a 28 GHz overmoded waveguide (e.g., as shown schematically in FIG. 2A).

FIG. 3 is a photograph of a portion of a directed-energy MMW drilling system and shows a small-signal beam combiner 142 coupled to a power combiner 140*a* like the power combiner shown in FIG. 2A. The small-signal beam combiner 142 decouples a 135-139 GHz radiative emission or temperature signal 109 received from the borehole 110 for temperature radiometry and a 94 GHz ROP/depth returned probe signal 108 from a small-signal transmission line 133 (implemented as a rectangular waveguide, a circular to rectangular transition, and a circular waveguide) that bends 90 degrees toward a high-power miter mirror 210. A temperature radiometer is used as the ancillary monitor 170. A hole in the miter mirror 210 radiatively couples the collinear, combined returned probe signal 108 and temperature signal from a larger diameter, high-power transmission line (not visible in the photograph) below the miter mirror 210 to the monitors 160, 170, such that the probe signal 108 and temperature signal propagate along the high-power transmission line with 28 GHz high-power radiation that is used to form the drilling beam 105. The top of the copper miter mirror 210, which is mounted on a 3" (76 mm) internal diameter 28 GHz high-power transmission line, is shown in the lower right of FIG. 3. The small-signal transmission line 133 comprises a 0.097" (2.5 mm) internal diameter copper circular waveguide having a vertical portion attached to the miter mirror 210 and aligned to a hole of the same diameter in the center of miter mirror, which introduces the probe signal 108 into the high-power transmission line to propagate colinearly with the high-power MMW radiation.

Continuing up from the miter mirror 210 in the example system of FIG. 3, a circular-to-rectangular waveguide transition to wr-8 band (90-140 GHz) is attached followed by a wr-8 E-plane bend. The E-plane bend attaches to a 3 dB wr-8 directional coupler orientated horizontally, which splits the combined return probe signal 108 and temperature signal between the two monitors 160, 170. The returned probe signal 108 for the 94 GHz ROP/depth monitor 160 and the temperature signal 109 for the GHz temperature radiometer are separated by the directional coupler in combination with a wr-8 to wr-6 (110-170 GHz) waveguide transition to the ancillary monitor 170 and a wr-8 to wr-10 (75-110 GHz) transition (partly visible) to the ROP/depth monitor 160. The wr-6 to wr-8 waveguide transition prevent the ROP/depth probe signals from interfering with the radiometer's received temperature signals because 94 GHz cannot propagate in the wr-6 waveguide. Likewise, the 28 GHz high-power drilling beam cannot propagate in the 0.097" diameter waveguide, shielding the monitors while giving them full access to monitoring the borehole target surface with higher-frequency beams.

2. Rate of Penetration/Depth Monitor Instrument

The ROP/depth monitor 160 can operate as either a reflectometer (reflection interferometer), a frequency-modulated (FM) radar, or a pulsed time-of-flight radar. In the reflectometer configuration, the frequency of the small-signal ROP/depth probe signal 108, also called the probe frequency, is fixed. The returned probe signal 108 is mixed with an un-transmitted part of itself to produce a DC signal whose amplitude depends on the round-trip return phase of the returned probe signal 108 relative to what it was before transmission. For a change in depth equal to a quarter of a wavelength at the probe frequency, the detected signal amplitude should vary from a maximum to a minimum or vice versa. Put differently, in the reflectometer configuration, the ROP/depth monitor 160 has a depth resolution, Δz, that can be written as:

$$\Delta z = \frac{1}{4}\lambda, \tag{1}$$

where λ is the wavelength at the probe frequency. The ROP is determined by measuring the rate at which the signal changes from maximum to minimum and the depth is determined by counting the number maximum-to-minimum changes from a starting or reference phase of the probe transmission as a function of time.

In the FM radar configuration, the probe frequency is swept over a bandwidth of Δf at some modulation frequency rate $f_m$. The phase shift of the round-trip reflection when detected in a mixer with an un-transmitted copy of the ROP/depth probe signal 108 generates a tone at an intermediate beat frequency, $f_B$, that is proportional to the depth, Z. The depth is given by:

$$Z = \frac{cf_B}{4f_m\Delta f}, \tag{2}$$

where c is the speed of the MMW propagation in the high-pressure fill of the high-power MMW transmission line 130. In some implementations, a gas may be forced down the transmission line 130 to aid in removal of vaporized and/or particulate material from the bottom of the borehole 110 to deepen the borehole. The resolution of the depth depends on the bandwidth of the frequency sweep:

$$\Delta z = \frac{c}{2\Delta f}. \tag{3}$$

The relative merits of the reflectometer and FM radar configurations can be appreciated by considering an example frequency. At 94 GHz (λ=3.19 mm) and tuning bandwidth of 1 GHz typically available for a commercial Gunn oscillator, the depth resolution for the reflectometer would be 0.8 mm (Eq. 1) and 150 mm for the FM radar (Eq. 3). The reflectometer is better suited for shallow boreholes (e.g., laboratory boreholes) that are less than a few times deeper than the FM radar resolution, while the FM radar is better suited for deep boreholes in the field. Also, the measurement of a frequency is more reliable for a deep borehole than an amplitude change that could vary for reasons other than a phase change.

In the time-of-flight configuration, a short electromagnetic pulse (having a full-width-half-maximum pulse duration of τ) is transmitted toward the bottom of the borehole. The round-trip time delay for the pulse's return to the surface electronics can be used to determines the distance to the bottom of the hole. The relation is given by:

$$Z = c\Delta t/2 \tag{4}$$

where c is the speed of the transmitted pulse and Δt is the round-trip delay time. The spatial resolution depends on the pulse length, τ, and the speed of the transmitted pulse:

$$\Delta z = c\tau \quad (5)$$

In air at atmospheric pressure, the speed of propagation is the speed of light. For a 1 ns pulse, which corresponds to available 1 GHz electronics, the resolution would be 300 mm.

The peak pulse power level could be as high at 100 kW in pulsed operation. The high-power and lower spatial resolution with a time-of-flight configuration would be suitable for the deepest boreholes that are drilled.

Figure 4:
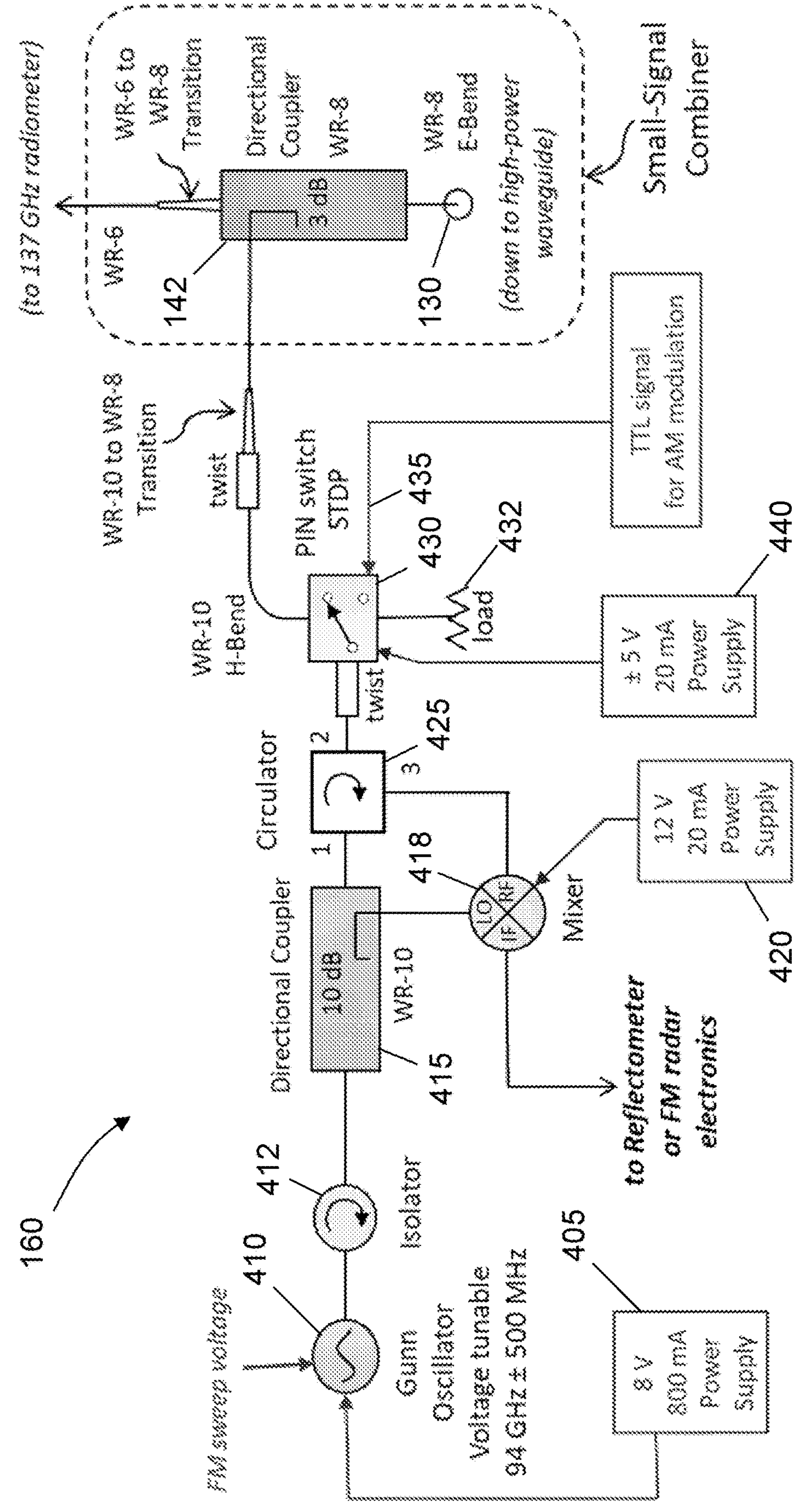
FIG. 4 illustrates a circuit for generating a 94 GHz probe signal for monitoring borehole ROP/depth using either reflectometry or frequency-modulated (FM) radar techniques. The circuit is shown with an optional small-signal combiner for coupling in a 137 GHz temperature signal.

FIG. 4 shows details of circuitry for a 94 GHz ROP/depth monitor 160 that can operate as a reflectometer or as an FM radar. The circuitry is built with wr-10 waveguide components used for the 75-110 GHz band. A voltage-tuned, 94 GHz±0.5 GHz Gunn oscillator 410 is driven by an 8 V, 800 mA power supply 405 and is connected to a 10 dB directional coupler 415 through an isolator 412 that protects the Gunn oscillator from back reflections. The directional coupler directs 10% of the Gunn oscillator output to a biased mixer 418, which is powered by 12 V, 20 mA power supply 420, as a local oscillator for determining the depth. The directional coupler directs the remaining 90% of the Gunn oscillator output to a three-port circulator 425 as the small-signal ROP/depth probe signal. The three-port circulator 425 directs this probe signal from port 1 to port 2, which is coupled to a solid-state single-pole double-throw (SPDT) PIN switch 430 powered by a ±5 V, 20 mA power supply 440 and controlled by a transistor-transistor logic (TTL) signal provided on a control input 435. The PIN switch 430 has one output connected to a load 432 and another output connects via waveguide components to a small-single combiner 142 as shown in FIG. 3 and described above. The small-signal combiner 142 combines the 94 GHz ROP/depth probe signal to a high-power transmission line 130 leading down the borehole. The small-signal combiner 142 can further direct a radiometry signal from the borehole and high-power transmission line 130 to a temperature radiometer for temperature monitoring. The combiner 142 also directs the returned probe signal from the borehole to port 2 of the three-port circulator 425, which outputs the returned probe signal to the biased mixer 418 via port 3 for detection. The returned signal from the biased mixer can then go to reflectometer or FM radar electronics for processing and determining depth of the borehole.

Figure 5:
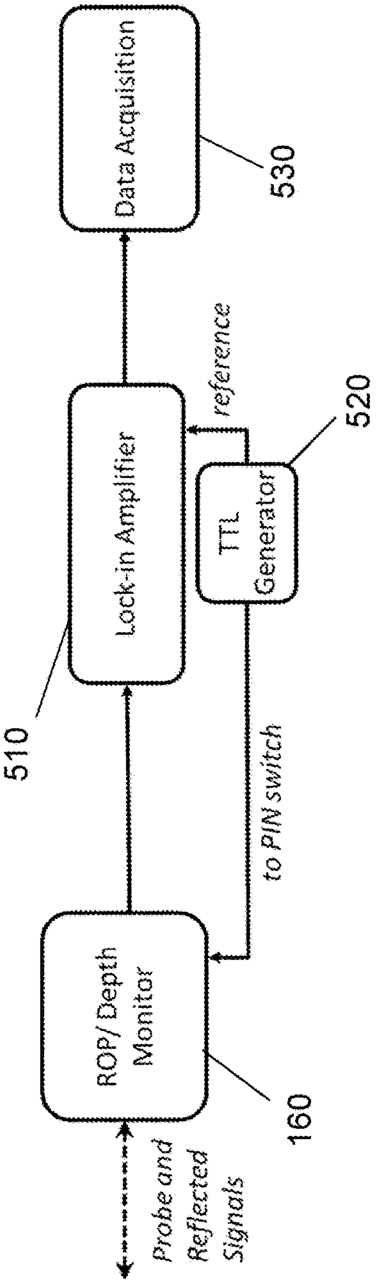
FIG. 5 shows a borehole ROP/depth monitor connection with other electronics to operate as a reflectometer.

The circuitry of FIG. 4 can be operated as an FM radar when a frequency sweep voltage is applied to the Gunn oscillator and the PIN switch is set to continuously transmit and receive a signal. The PIN switch 430 can also be removed from the circuit to reduce transmit and signal loses due to absorption in the switch. FIG. 5 shows the ROP/depth monitor 160 connected to a lock-in amplifier 510, TTL signal generator 520, and data acquisition electronics 530 for operation as a reflectometer. The TTL generator provides a 5 V square wave at a frequency typically over 100 Hz to the PIN switch's control input 435 (FIG. 4) to alternately direct the probe signal to the target or to the load 432, which modulates the probe signal from the ROP/depth monitor 160 sent down the borehole. The returned amplitude-modulated (AM; on/off) reflectometer signal is acquired by the lock-in amplifier 510 using a signal from the TTL generator 520 as a reference. Using the lock-in amplifier 510 allows detection of very weak signals. The output of the lock-in amplifier 510 is directed to a data acquisition system that can process, store, and/or display signals from the lock-in amplifier.

Figure 6:
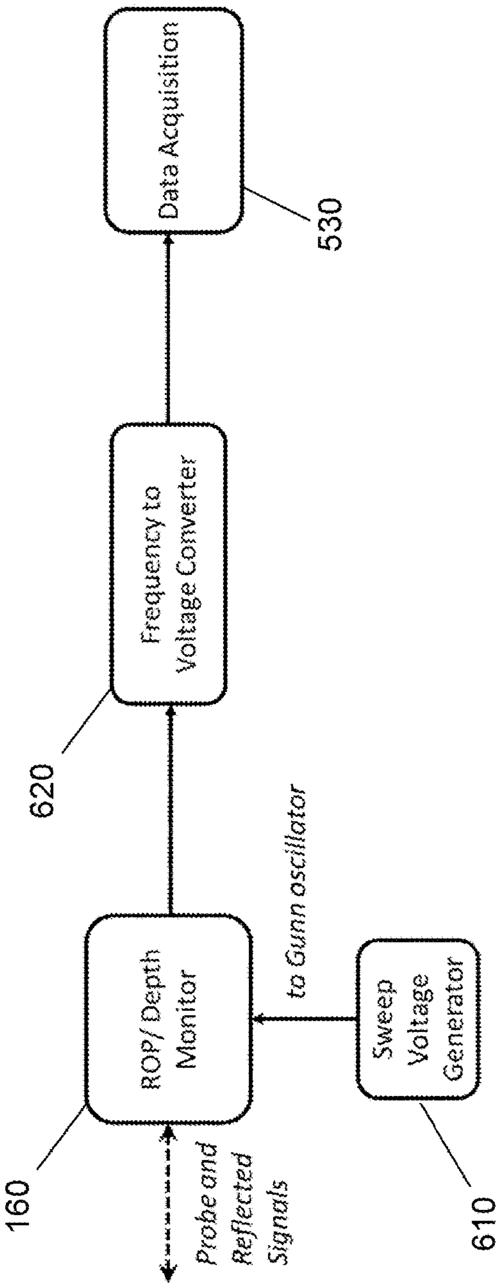
FIG. 6 shows a borehole ROP/depth monitor connection with other electronics to operate as an FM radar.

FIG. 6 shows the ROP/depth monitor 160 connected to a voltage sweep generator 610, frequency-to-voltage converter 620, and data acquisition electronics 530 for operation as an FM radar. Output from the sweep voltage generator 610 is applied to the Gunn oscillator 410 (FIG. 4) to modulate the probe frequency (e.g., it linearly sweeps or chirps the frequency of the probe signal). The biased mixer 418 mixes the resulting returned probe signal with a local oscillator copy of the un-transmitted swept-frequency probe signal to generate a tone at the intermediate frequency (IF) port of the mixer whose beat frequency is proportional to the distance to the target (bottom of borehole). This beat frequency can be acquired by the data acquisition electronics 530 directly for further processing or can be converted to a voltage by the frequency-to-voltage converter 620 and provided to the data acquisition electronics 530. Received data can be processed, displayed, and/or stored by the data acquisition electronics 530. When the ROP/depth monitor is configured for FM radar operation, the PIN switch 430 is maintained in a position to continuously transmit and receive the signals (e.g., no switching signals to the load 432). In some implementations, the PIN switch 430 can be removed from the circuit to increase signals strength.

Figure 7:
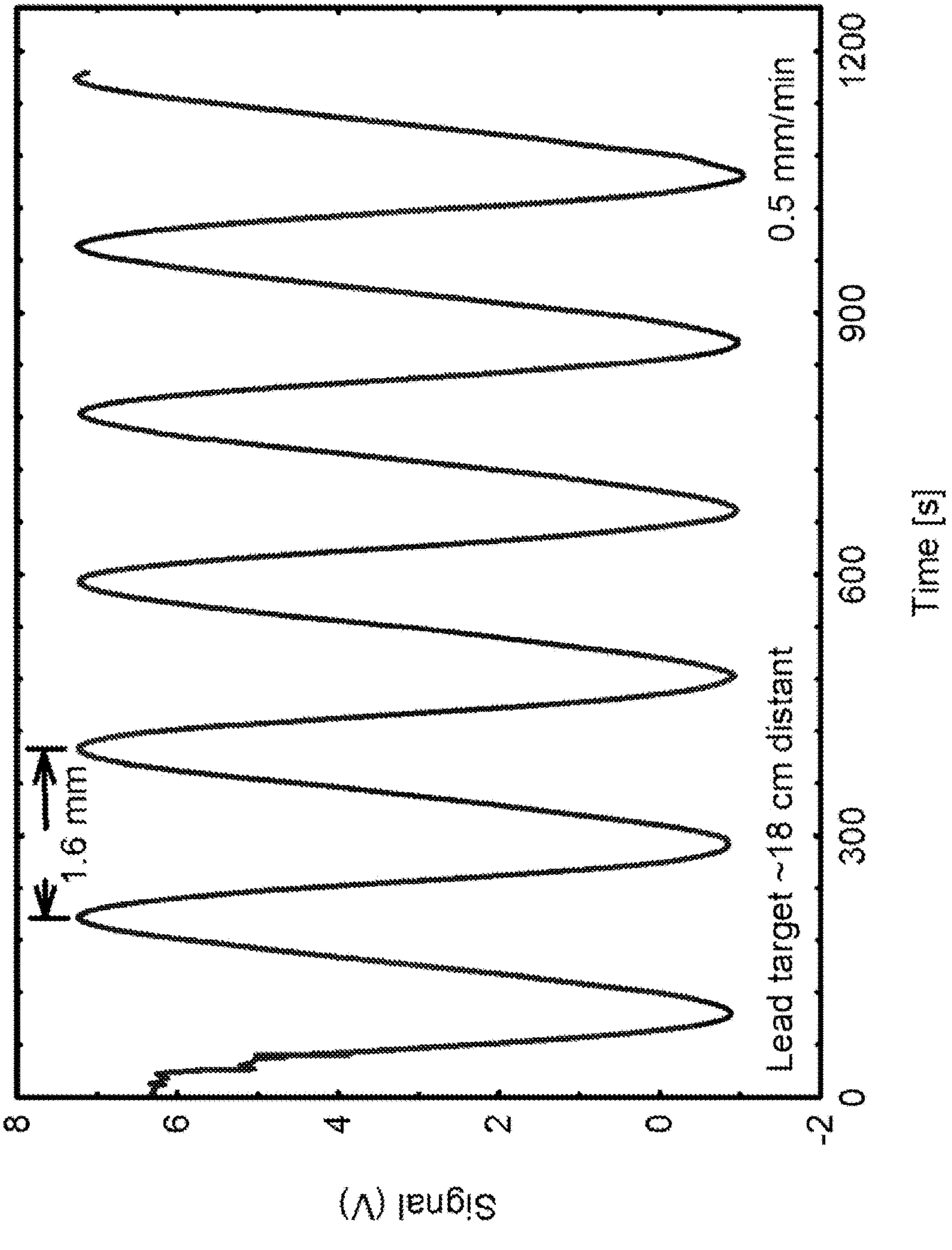
FIG. 7 is a plot of the signal generated by a 94 GHz ROP/depth monitor beam probing a flat lead target moving uniformly away from the monitor at a starting distance of about 18 cm and a speed of 0.5 mm/min.

FIG. 7 shows an example of the signal detected by the ROP/depth monitor 160 when operated as reflectometer. The target in this case was a flat lead brick on a motorized translation stage located about 18 cm from a launch horn connected to a wr-10 waveguide output of the reflectometer (e.g., an output from the PIN switch 430), which would normally be coupled to the small-signal combiner 142 as shown in FIG. 4. The target was translated in depth at a uniform rate of 0.5 mm/hr. The signal moves through peaks (maximum-minimum-maximum) every half wavelength of 1.6 mm. FIG. 7 shows a total of six such fringes going through a total distance of 9.6 mm. In an actual borehole application on a melt surface target, the fringes might not be as uniform because of non-flat, fluctuating surfaces and/or non-uniform penetration rates. For instance, if part of the surface at the bottom of the borehole varies in height by about a ¼ of a wavelength or more at the probe frequency, then it may reflect part of the probe signal out of phase with the rest of the probe signal, reducing the fringe peak signal strength (and fringe contrast).

Figure 8:
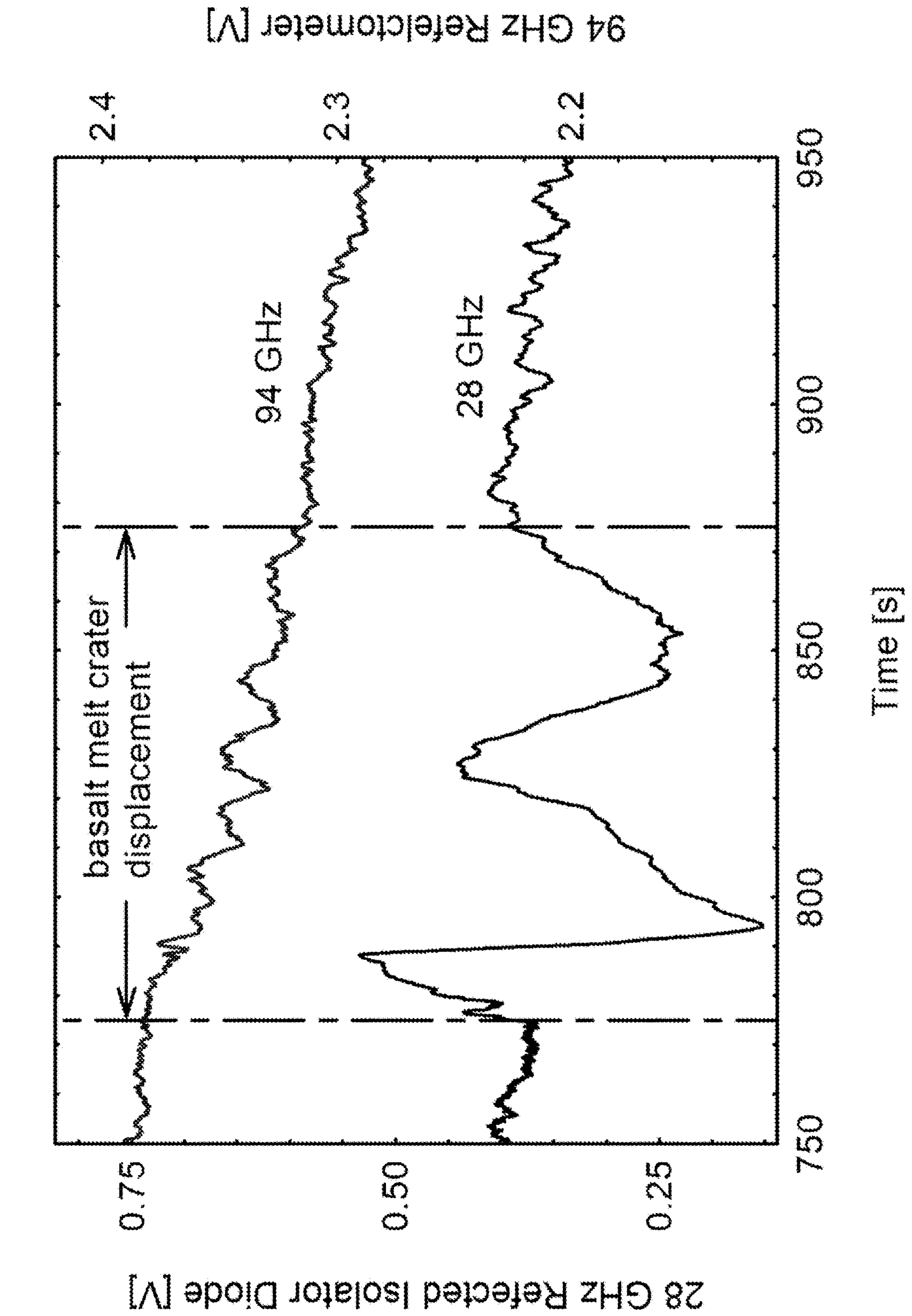
FIG. 8 shows plots of signals generated by a 94 GHz ROP/depth monitor beam (right axis) and by a 28 GHz drilling beam (left axis) both used to probe simultaneously the formation of a melt crater in the surface of a basalt rock while the drilling beam removes the rock.

FIG. 8 shows reflectometer signals from a crater melted into a basalt rock surface by a 28 GHz drilling beam having a power of about 4.5 kW in about a 40 mm diameter incident on the surface of the basalt. This system uses two reflectometer beams at different frequencies: one at the drilling beam frequency of 28 GHz that is picked off from returned drilling beam radiation and a separate 94 GHz monitor beam (e.g., both FIG. 1A and FIG. 1B together). The top plot is the reflectometer signal from the 94 GHz monitor 160 and the bottom plot is the reflectometer signal from a 28 GHz Schottky diode detector/mixer 184 coupled to the reflected power isolator 180 (FIG. 1B) that also samples the forward high-power MMW radiation. The fringe peaks are not as ideal as shown for a laboratory test from a flat solid surface. The plots show about six 94 GHz peaks to about two 28 GHz peaks in direct portion to the probe signal wavelengths ratio for formation of a crater about 10 mm deep.

Figure 9:
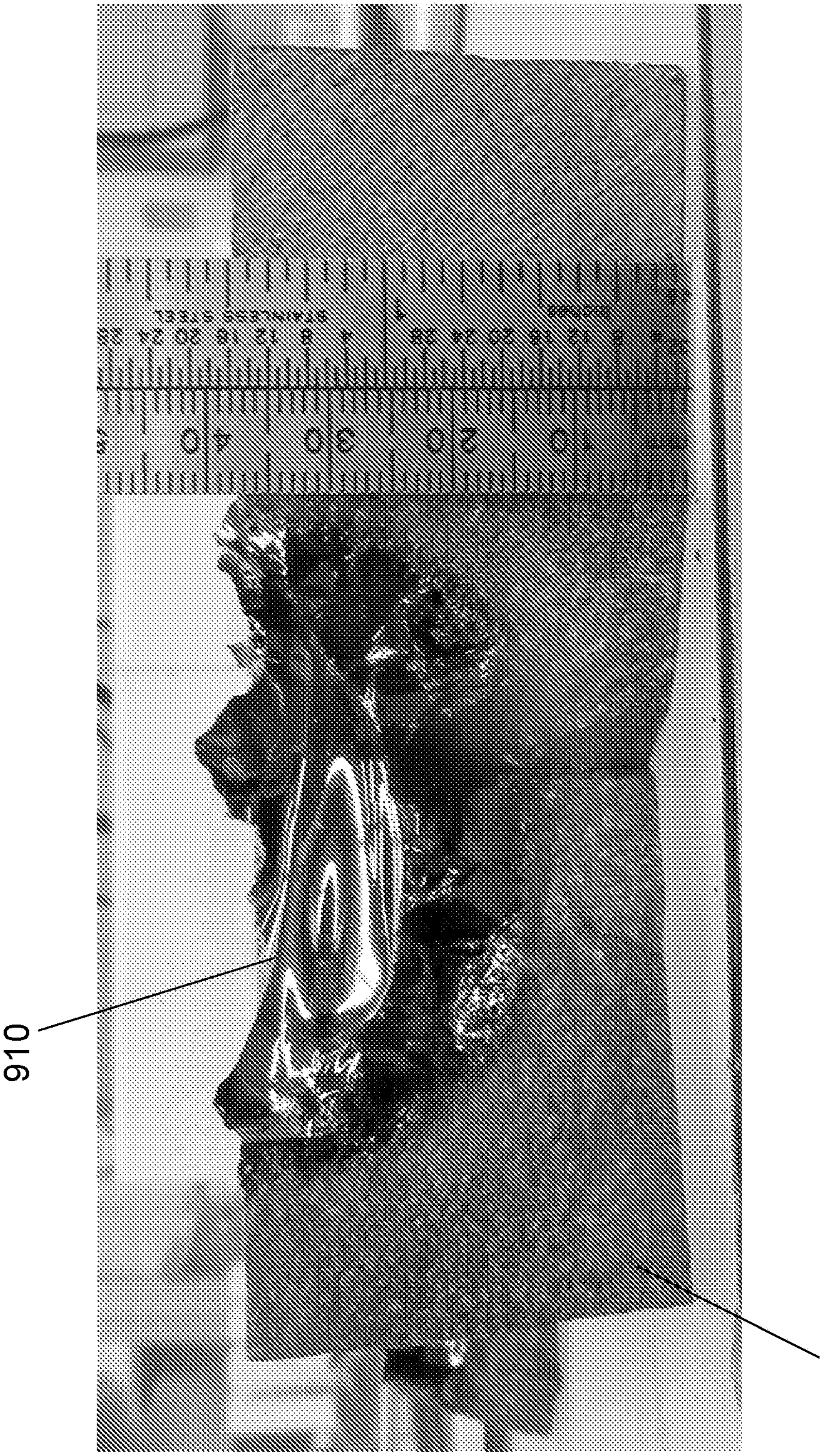
FIG. 9 is a photograph of a broken-open cross section of a MMW beam melt crater in a basalt rock.

FIG. 9 shows a cross section of the basalt crater 910 created by exposure of solid basalt rock 920 to the drilling beam, as described in connection with FIG. 8. The crater dept is about 10 mm. Molten rock has pooled and solidified in the crater filling a substantial portion of the drilled region. Having different reflectometer probe signals at different frequencies can mitigate uncertainty with monitoring non-ideal reflectometer signals. For example, detecting peaks and cross-correlating the number of detected peaks in accordance with the probe wavelength ratio of the different probe signals can increase certainty in depth measurements.

Apparatus for measuring the depth or rate of penetration of a borehole drilled with a millimeter-wave directed-energy drilling beam can be implemented and/or included in drilling systems in various configurations. Example configurations are listed below. Corresponding methods of measuring depth or rate of penetration can also be implemented.

(1) A system for drilling a borehole, the system comprising: a source to generate a millimeter-wave radiation; a transmission line, coupled to the source, to guide the millimeter-wave radiation to a bottom of the borehole and to form a millimeter-wave drilling beam in a region at a distal end of the transmission line; a rate-of-penetration/depth monitor, coupled to the transmission line, to monitor a depth and/or a rate-of-penetration of the borehole; and a beam combiner, coupled to the transmission line and to the rate-of-penetration/depth monitor, to couple a probe signal into the transmission line for transmission to the bottom of the borehole and to couple a returned probe signal, generated by reflection and/or scattering of the probe signal from the bottom of the borehole, from the transmission line to the rate-of-penetration/depth monitor.

(2) The system of configuration (1), wherein the rate-of-penetration/depth monitor is configured to operate as a reflectometer.

(3) The system of configuration (1), wherein the rate-of-penetration/depth monitor is configured to operate as a frequency-modulated radar.

(4) The system of configuration (1), wherein the rate-of-penetration/depth monitor is configured to operate as a pulse-modulated time-of-flight radar.

(5) The system of any one of configurations (1) through (4), wherein the rate-of-penetration/depth monitor is configured to generate the probe signal at a frequency different than a frequency of the millimeter-wave radiation.

(6) The system of any one of configurations (1) through (5), wherein the beam combiner is configured to direct a portion of the millimeter-wave radiation returned from the bottom of the borehole to the rate-of-penetration/depth monitor as the returned probe signal.

(7) The system of any one of configurations (1) through (6), wherein the beam combiner comprises a miter mirror to reflect the millimeter-wave radiation around a bend of the transmission line and having a hole therein to pass the probe signal.

(8) The system of any one of configurations (1) through (7), further comprising: a temperature monitor to receive radiation indicative of a temperature of the borehole; and a small-signal beam combiner, coupled to the transmission line, to couple the radiation from the transmission line, wherein the radiation propagates along the transmission line with the returned probe signal.

(9) A method of measuring a depth and/or a rate of penetration of a borehole drilled with millimeter-wave radiation guided by a transmission line to a bottom of the borehole and formed into a millimeter-wave drilling beam, the method comprising: coupling a probe signal into the transmission line; guiding the probe signal to the bottom of the borehole with the transmission line, at least a portion of the probe signal reflecting and/or scattering from the bottom of the borehole as a returned probe signal; guiding the returned probe signal from the bottom of the borehole with the transmission line; coupling the returned probe signal out of the transmission line; mixing the returned probe signal with a local oscillator to produce an intermediate frequency signal; and determining the depth and/or the rate of penetration of the borehole from an amplitude and/or a frequency of the intermediate frequency signal.

(10) The method of (9), further comprising modulating an amplitude of the probe signal and determining the depth and/or the rate of penetration of the borehole is based on the amplitude of the intermediate frequency signal.

(11) The method of (9), further comprising modulating a frequency of the probe signal and determining the depth and/or the rate of penetration of the borehole is based on the frequency of the intermediate frequency signal.

(12) The method of (9), further comprising forming the probe signal into at least one pulse; and determining the depth and/or the rate of penetration of the borehole based on a time of flight of the at least one pulse.

(13) The method of any one of (9) through (12), further comprising generating the probe signal at a frequency that is different than a frequency of the millimeter-wave radiation.

(14) The method of any one of (9) through (12), further comprising forming the probe signal from a portion of the millimeter-wave radiation.

(15) The method of any one of (9) through (14), further comprising receiving radiation indicative of a temperature of the bottom of the borehole via the transmission line.

(16) A method of forming a borehole with a millimeter-wave drilling beam and determining a depth and/or a rate of penetration of the borehole, the method comprising: coupling millimeter-wave radiation into a transmission line; coupling a probe signal into the transmission line; guiding the millimeter-wave radiation and the probe signal to a bottom of the borehole with the transmission line; forming the millimeter-wave drilling beam at a distal end of the transmission line; increasing a depth of the borehole with the millimeter-wave drilling beam; guiding a returned probe signal from the bottom of the borehole with the transmission line, the returned probe signal being at least a portion of the probe signal reflecting and/or scattering from the bottom of the borehole; coupling the returned probe signal out of the transmission line; mixing the returned probe signal with a local oscillator to produce an intermediate frequency signal; and determining the depth and/or the rate of penetration of the borehole from an amplitude and/or a frequency of the intermediate frequency signal.

(17) The method of (16), further comprising modulating an amplitude or frequency of the probe signal and determining the depth and/or the rate of penetration of the borehole is based on the amplitude of the intermediate frequency signal.

(18) The method of (16), further comprising forming the probe signal into at least one pulse; and determining the depth and/or the rate of penetration of the borehole based on a time of flight of the at least one pulse.

(19) The method of any one of (16) through (18), further comprising: coupling a first temperature signal that is emitted from the bottom of the borehole into the transmission line while drilling with the millimeter-wave drilling beam; coupling the first temperature signal from the transmission line to a temperature monitor; determining a first temperature with the temperature monitor; adjusting an amount of power in the millimeter wave radiation based on the first temperature; ceasing the guiding of the millimeter-wave radiation to the bottom of the borehole; allowing the bottom of the borehole to reach a lower temperature; coupling at least a second temperature signal that is emitted from the bottom of the borehole into the transmission line; coupling at least the second temperature signal from the transmission line to a temperature monitor; determining at least a second temperature with the temperature monitor; and determining whether the drilling has reached a sufficient depth to access geothermal heat based on at least the second temperature.

4. Conclusion

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for drilling a borehole, the system comprising:

a source to generate a millimeter-wave radiation;

a transmission line, coupled to the source, to guide the millimeter-wave radiation to a bottom of the borehole and to form a millimeter-wave drilling beam in a region at a distal end of the transmission line;

a rate-of-penetration/depth monitor, coupled to the transmission line, to monitor a depth and/or a rate-of-penetration of the borehole; and a beam combiner, coupled to the transmission line and to the rate-of-penetration/depth monitor, to guide a probe signal into the transmission line for transmission to the bottom of the borehole and to guide a returned probe signal, generated by reflection and/or scattering of the probe signal from the bottom of the borehole, from the transmission line to the rate-of-penetration/depth monitor.

2. The system of claim 1, wherein the rate-of-penetration/depth monitor is configured to operate as a reflectometer.

3. The system of claim 1, wherein the rate-of-penetration/depth monitor is configured to operate as a frequency-modulated radar.

4. The system of claim 1, wherein the rate-of-penetration/depth monitor is configured to operate as a pulse-modulated time-of-flight radar.

5. The system of claim 1, wherein the rate-of-penetration/depth monitor is configured to generate the probe signal at a frequency different than a frequency of the millimeter-wave radiation.

6. The system of claim 1, wherein the beam combiner is configured to direct a portion of the millimeter-wave radiation returned from the bottom of the borehole to the rate-of-penetration/depth monitor as the returned probe signal.

7. The system of claim 1, wherein the beam combiner comprises a miter mirror to reflect the millimeter-wave radiation around a bend of the transmission line and having a hole therein to pass the probe signal.

8. The system of claim 1, further comprising:

a temperature monitor to receive radiation indicative of a temperature of the borehole; and a small-signal beam combiner, coupled to the transmission line, to guide the radiation from the transmission line, wherein the radiation propagates along the transmission line with the returned probe signal.

9. A method of measuring a depth and/or a rate of penetration of a borehole drilled with millimeter-wave radiation guided by a transmission line to a bottom of the borehole and formed into a millimeter-wave drilling beam, the method comprising:

guiding a probe signal into the transmission line;

guiding the probe signal to the bottom of the borehole with the transmission line, at least a portion of the probe signal reflecting and/or scattering from the bottom of the borehole as a returned probe signal;

guiding the returned probe signal from the bottom of the borehole with the transmission line;

guiding the returned probe signal out of the transmission line;

mixing the returned probe signal with a local oscillator signal to produce an intermediate frequency signal; and determining the depth and/or the rate of penetration of the borehole from an amplitude and/or a frequency of the intermediate frequency signal.

10. The method of claim 9, further comprising:

modulating an amplitude of the probe signal.

11. The method of claim 9, further comprising:

modulating a frequency of the probe signal.

12. The method of claim 9, further comprising:

forming the probe signal into at least one pulse; and determining the depth and/or the rate of penetration of the borehole based on a time of flight of the at least one pulse.

13. The method of claim 9, further comprising:

generating the probe signal at a frequency that is different than a frequency of the millimeter-wave radiation.

14. The method of claim 9, further comprising forming the probe signal from a portion of the millimeter-wave radiation.

15. The method of claim 9, further comprising:

receiving radiation indicative of a temperature of the bottom of the borehole via the transmission line.

16. A method of forming a borehole with a millimeter-wave drilling beam and determining a depth and/or a rate of penetration of the borehole, the method comprising:

guiding millimeter-wave radiation into a transmission line;

guiding a probe signal into the transmission line;

guiding the millimeter-wave radiation and the probe signal to a bottom of the borehole with the transmission line;

forming the millimeter-wave drilling beam at a distal end of the transmission line;

increasing a depth of the borehole with the millimeter-wave drilling beam;

guiding a returned probe signal from the bottom of the borehole with the transmission line, the returned probe signal being at least a portion of the probe signal reflecting and/or scattering from the bottom of the borehole;

guiding the returned probe signal out of the transmission line;

mixing the returned probe signal with a local oscillator signal to produce an intermediate frequency signal; and determining the depth and/or the rate of penetration of the borehole from an amplitude and/or a frequency of the intermediate frequency signal.

17. The method of claim 16, further comprising:

modulating an amplitude or frequency of the probe signal.

18. The method of claim 16, further comprising:

forming the probe signal into at least one pulse; and determining the depth and/or the rate of penetration of the borehole based on a time of flight of the at least one pulse.

19. The method of claim 16, further comprising:

guiding a first temperature signal that is emitted from the bottom of the borehole into the transmission line while drilling with the millimeter-wave drilling beam;

guiding the first temperature signal from the transmission line to a temperature monitor;

determining a first temperature with the temperature monitor;

adjusting an amount of power in the millimeter wave radiation based on the first temperature;

ceasing the guiding of the millimeter-wave radiation to the bottom of the borehole;

allowing the bottom of the borehole to reach a lower temperature;

guiding at least a second temperature signal that is emitted from the bottom of the borehole into the transmission line;

guiding at least the second temperature signal from the transmission line to a temperature monitor;

determining at least a second temperature with the temperature monitor; and determining whether the drilling has reached a sufficient depth to access geothermal heat based on at least the second temperature.

* * * * *